US006290591B1

(12) United States Patent
Hergott et al.

(10) Patent No.: US 6,290,591 B1
(45) Date of Patent: Sep. 18, 2001

(54) METHOD AND APPARATUS FOR DETERMINING THE NUMBER OF LOOPED SAUSAGES FOR DEPOSIT ON A SMOKESTICK

(75) Inventors: Steven P. Hergott; Vincent Basile, II, both of West Des Moines; James Linden Myers, Urbandale, all of IA (US); Marcelinus Franciscus Ottow, Rosmalen (NL); Michael S. Simpson, Norwalk, IA (US)

(73) Assignee: Townsend Engineering Company, Des Moines, IA (US)

( * ) Notice: Subject to any disclaimer, the term of this patent is extended or adjusted under 35 U.S.C. 154(b) by 0 days.

(21) Appl. No.: 09/615,994

(22) Filed: Jul. 14, 2000

Related U.S. Application Data

(63) Continuation-in-part of application No. 09/573,917, filed on May 18, 2000, and a continuation-in-part of application No. 29/123,112, filed on May 11, 2000.

(51) Int. Cl.[7] .................................................. A22C 15/00
(52) U.S. Cl. .............................. 452/51; 452/186
(58) Field of Search .............................. 452/51, 177, 186

(56) References Cited

U.S. PATENT DOCUMENTS

| D. 397,287 | 8/1998 | Hergott et al. ........................ D8/367 |
| 3,115,668 | 12/1963 | Townsend . |
| 3,191,222 | 6/1965 | Townsend . |
| 3,264,679 | * 8/1966 | Moekle .................................. 452/51 |
| 3,312,442 | 4/1967 | Moeller ............................... 248/217 |
| 3,347,504 | 10/1967 | Goss .................................... 248/488 |
| 3,423,058 | 1/1969 | Kuster ................................. 248/301 |
| 3,972,499 | 8/1976 | Simmons ............................ 248/224 |
| 4,547,931 | * 10/1985 | Staudenrausch et al. ............. 452/51 |
| 4,644,607 | * 2/1987 | Sziede ................................... 452/51 |
| 5,085,612 | * 2/1992 | Muller et al. ......................... 452/51 |
| 5,102,368 | * 4/1992 | Strasser et al. ....................... 452/51 |
| 5,163,864 | * 11/1992 | Burger et al. ......................... 452/51 |
| 5,354,229 | * 10/1994 | Markwardt et al. ................... 452/51 |
| 5,354,230 | * 10/1994 | McFarlane et al. ................... 452/51 |
| 5,896,809 | * 4/1999 | Miller .................................. 452/51 |

* cited by examiner

*Primary Examiner*—Willis Little
(74) *Attorney, Agent, or Firm*—Zarley, McKee, Thomte, Voorhees & Sease

(57) ABSTRACT

A method for determining the number of loops of linked sausages for deposit on a smokestick includes; preparing an elongated strand of stuffed sausages; dividing the strand of sausages into a plurality of sausage links; determining the desired number of looped sausages to be prepared; depositing the linked sausages into the determined loops and depositing the loops on a plurality of adjacent hooks on a moving conveyor; intercepting the deposit of linked sausages on adjacent hooks when the predetermined number of linked loops of sausages have been deposited in the predetermined number of loops on the hooks to provide a visible variation in the configuration of linked sausages on the conveyor; and repeating the foregoing steps to create another group of sausages similar to the group of sausages created by the foregoing steps.

26 Claims, 10 Drawing Sheets

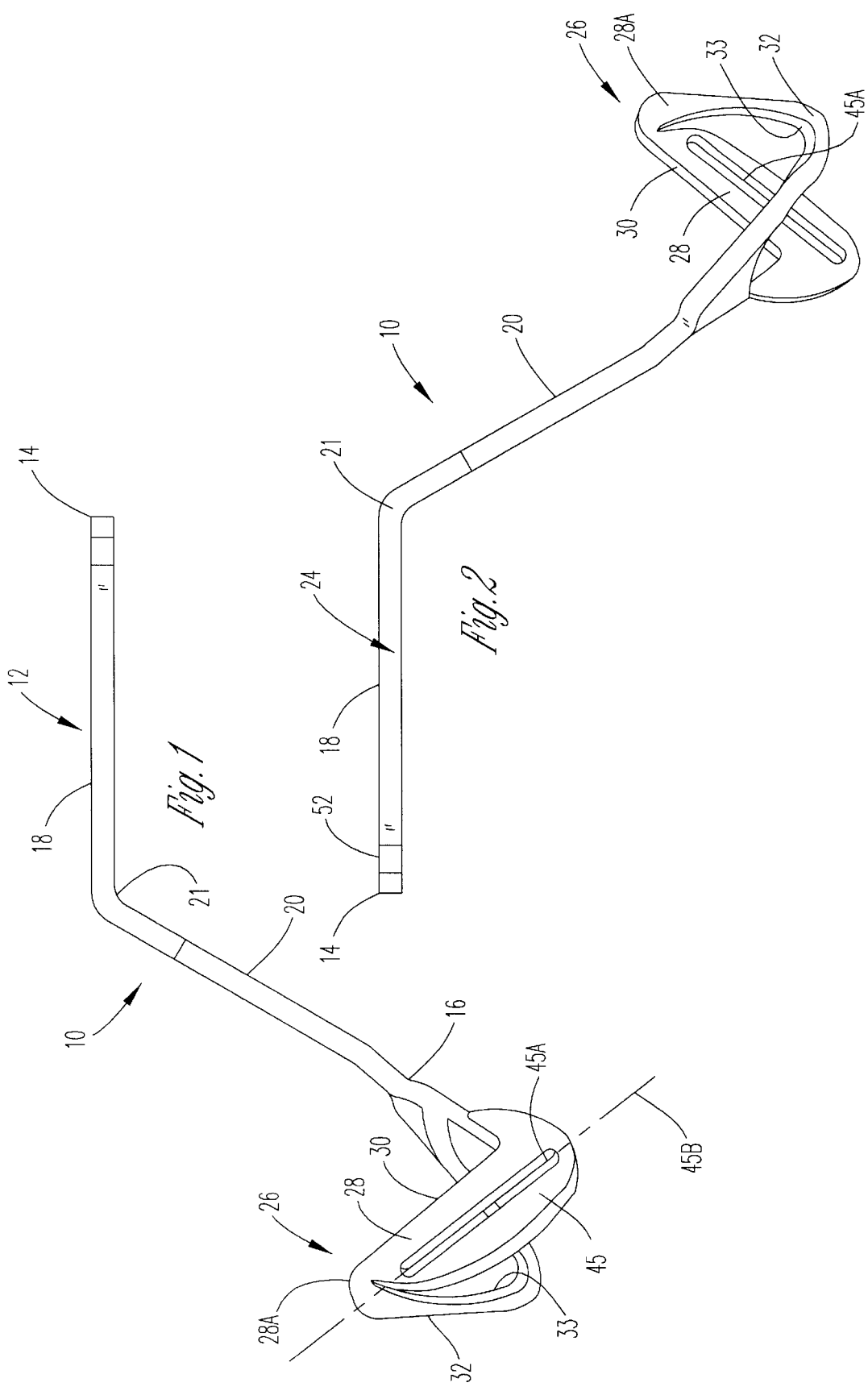

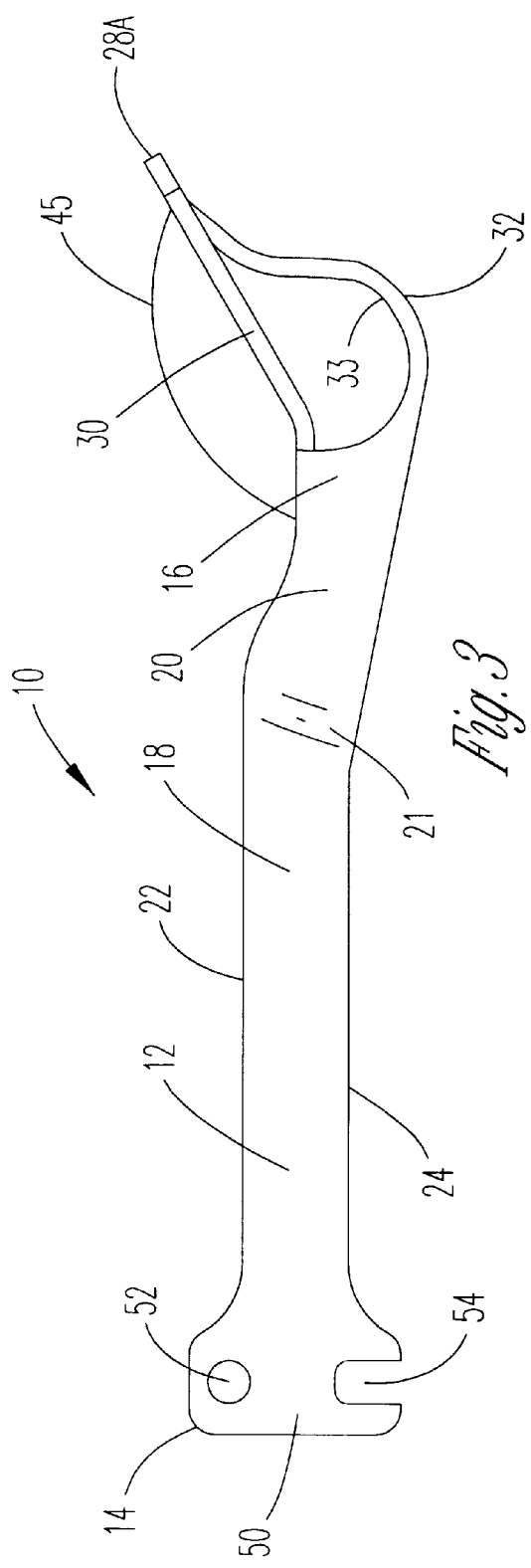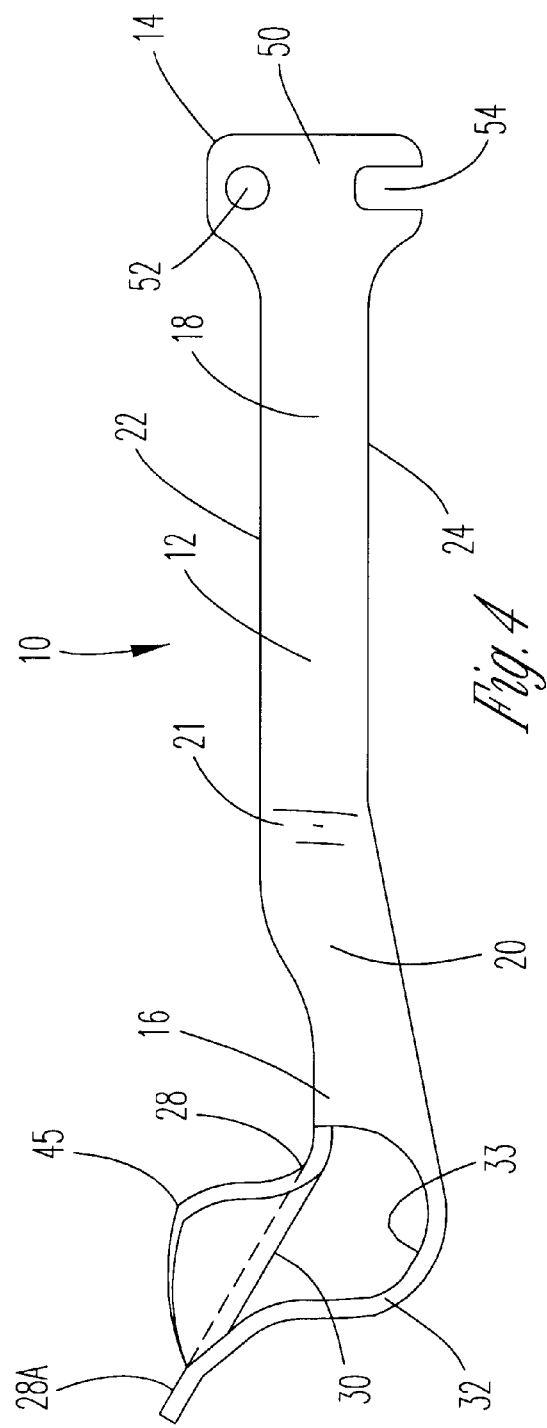

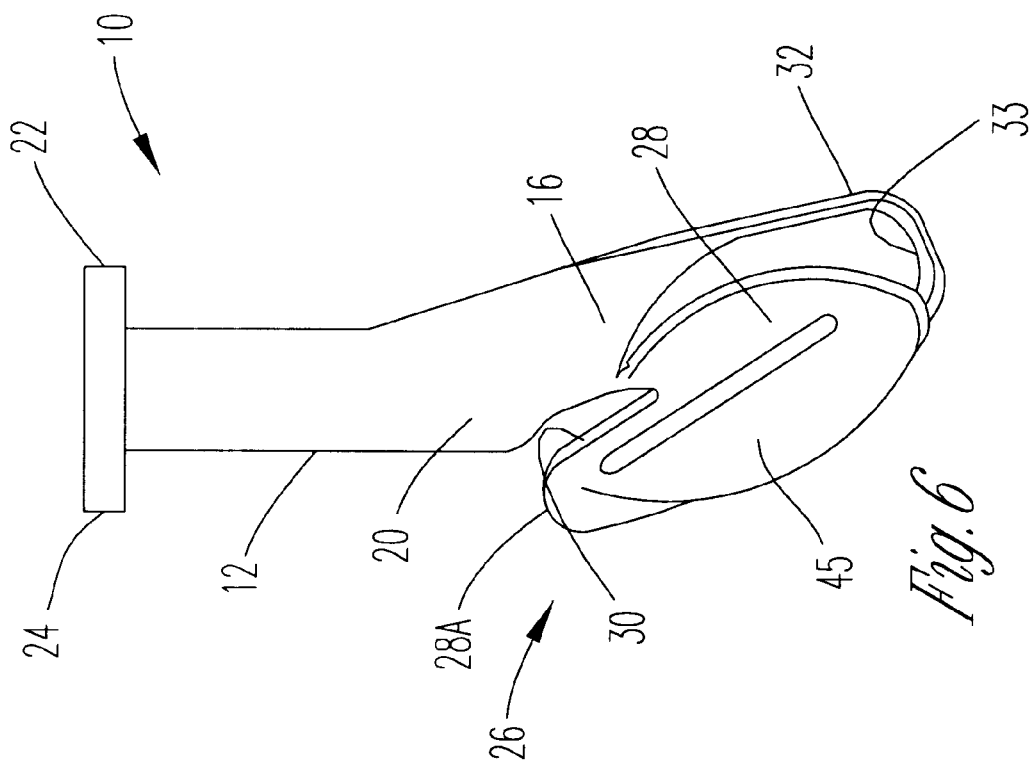
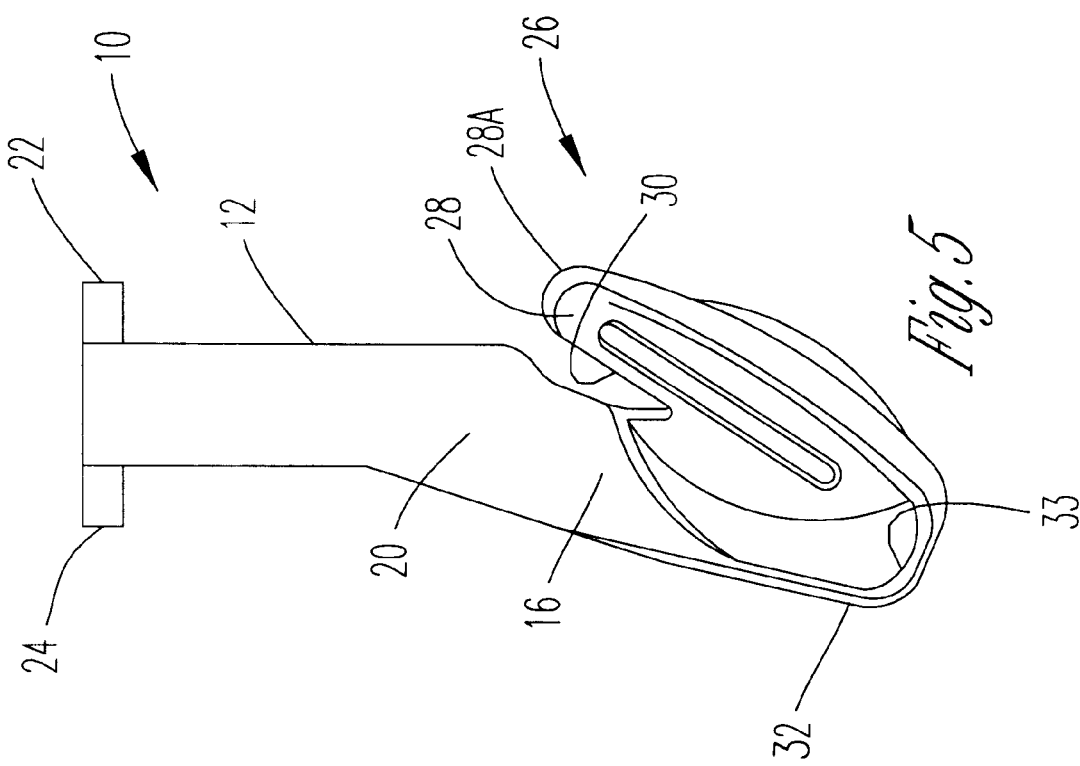

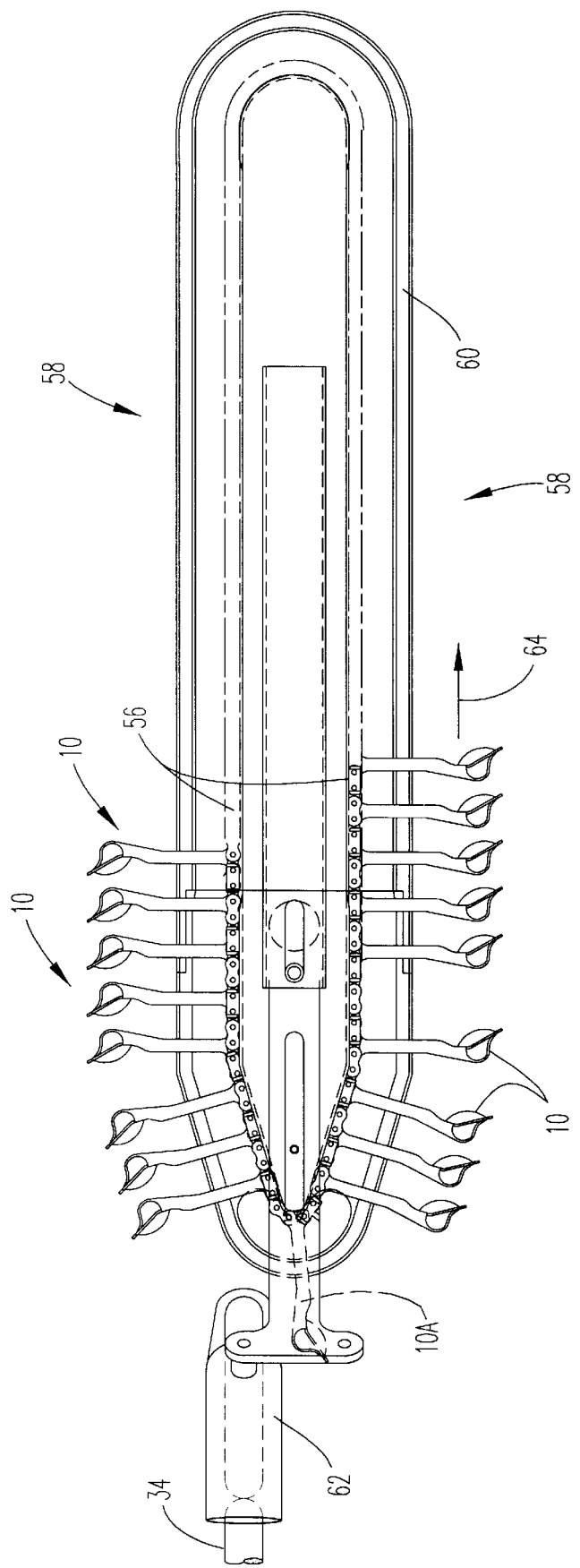

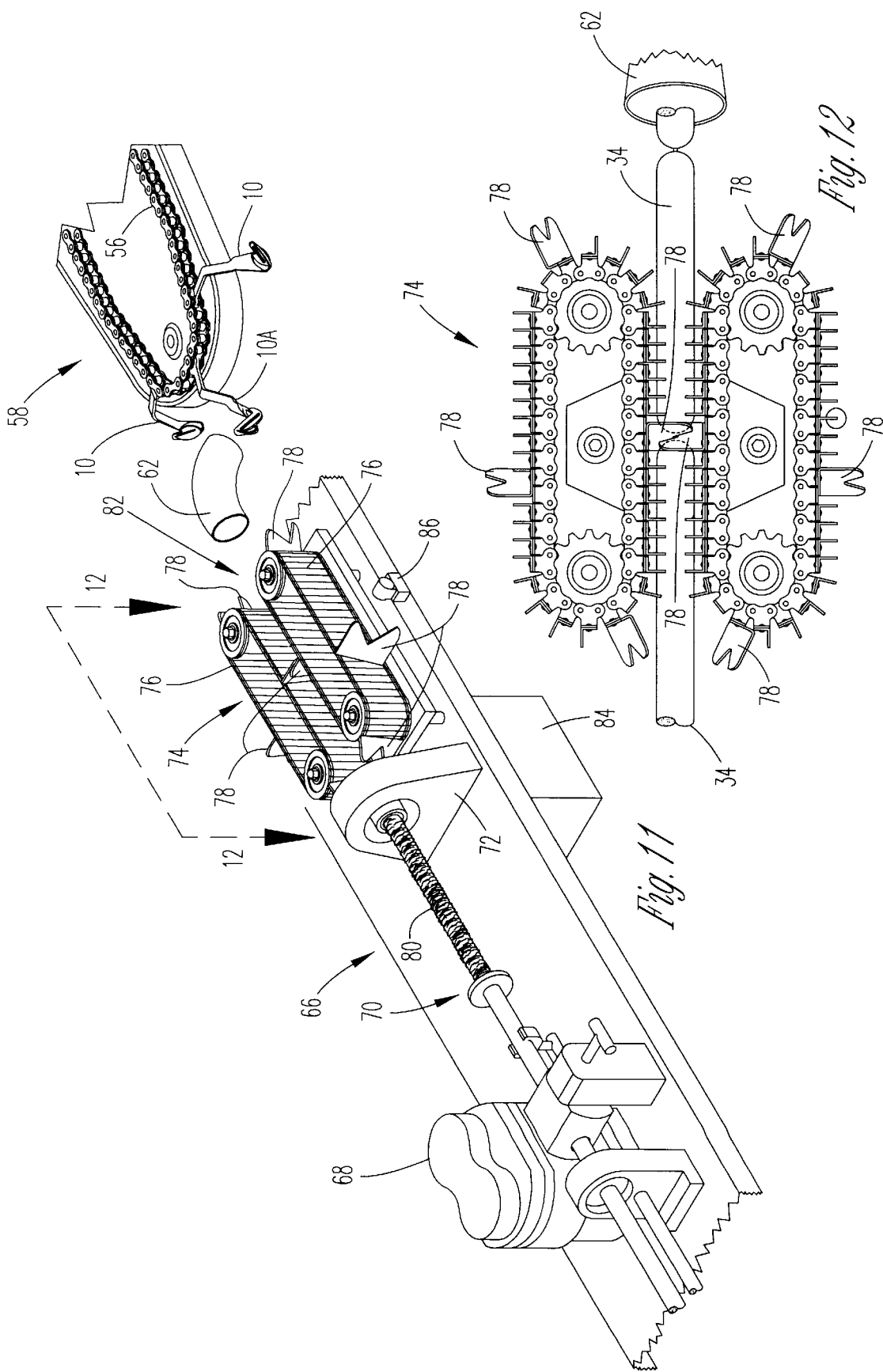

US 6,290,591 B1

METHOD AND APPARATUS FOR DETERMINING THE NUMBER OF LOOPED SAUSAGES FOR DEPOSIT ON A SMOKESTICK

CROSS-REFERENCE TO A RELATED APPLICATION

This application is a continuation-in-part of U.S. applications Ser. No. 29/123,112 and Ser. No. 09/573,917, (pending) filed May 11, 2000, and May 18, 2000, respectively.

BACKGROUND OF THE INVENTION

Sausage making machines of the type long known in the industry (U.S. Pat. Nos. 3,191,222 and 3,115,668) are often accompanied by a conveyor which holds the strand of linked sausages in loops, each supported by a hook on the conveyor. The loops of linked sausages are then manually removed from the conveyor by use of an elongated smokestick wherein the smokestick is inserted through a plurality of loops, and then lifted from the hooks. The loaded smokestick is then delivered to a smokehouse for conventional processing. It is important that each smokestick be fully loaded to fully utilize the capacity of the smokehouse. Completely filling the smokestick optimizes the cooking process and serves to control the thermo process better in the smokehouse. Utilization of the full length of the smokestick is also a savings in labor in that fewer sticks must be inserted and hung in the smokehouse if they are full as compared to being half empty.

Another benefit of optimally filled smokesticks is to minimize the amount of touching of sausages of adjacent loops. The touching of adjacent sausages leave white spots where they engage each other. This product is fully cooked but does not look that way, and the white spots can possibly be a basis for downgrading the product. Thus, the smokestick should be fully loaded, but not overloaded so that the touching phenomenon takes place.

As is well known, shirred artificial casings of known length are commonly used to encase a strand of sausage material. The strand is extruded into the casing which is then twisted and pinched into a plurality of sausage links of equal length. The linked strand is then sequentially looped on the hooks of a conveyor with each hook carrying a loop of linked sausages containing a predetermined number. With these shirred casings the casing length can be chosen to optimally fill the smokestick, the machine is programmed to set the number of sausages per loop and the hook spacing on the conveyor will determine the gap between loops. For example, with an artificial casing having a total length of 120 feet, (102 useable feet) and with sausages being linked to a length of 5 inches, 243 sausages per casing will be produced. If the hook spacing in the conveyor is 1⅞ths inches, 9 sausages per loop would give the operator 27 loops of sausage spaced at intervals of 1⅞ths inches. In that case, 51" of a 61" smokestick would be used, leaving sufficient length for hanging the smokestick in the smokehouse. As shirred artificial casings are supplied in consistent lengths, there is no need to count the number of loops for each stick.

However, in the case of natural casings, which vary in diameter and length, the process of fully loading a smokestick is much more difficult. Fully loading a smokestick with natural casings can involve the use of a partial casing, multiple casings, or multiple casings and partial casings. Currently, sausage machine operators have to count off loops of the product and then make separations in the middle of a natural casing if necessary.

It is therefore a principal object of this invention to provide a method and apparatus for determining the number of linked sausages for deposit on a smokestick for both artificial and natural casing materials.

A further object of this invention is to provide a method and apparatus for determining the number of linked sausages for deposit on a smokestick which is accurate and efficient.

A still further object of this invention is to provide a method and apparatus for determining the number of linked sausages for deposit on a smokestick which will permit the operator of the sausage encasing machine to easily and quickly recognize when a predetermined number of linked sausages and loops have been delivered to the conveyor for optimally loading a smokestick of predetermined length.

These and other objects will be apparent to those skilled in the art.

SUMMARY OF THE INVENTION

The method for determining the number of linked sausages for deposit on a smokestick involves extruding meat emulsion into an elongated casing, and then moving the filled casing through a conventional linker to create an elongated strand of linked sausages. The number of linked sausages in a loop is predetermined to provide the size of the loop of linked sausages to be placed on a given hook of the conveyor. This is done by preprogramming the gear ratio between the linker and the conveyor to hang the preprogrammed number of sausages per loop.

When a controller determines the total number of sausages to be deposited on a given smokestick, by taking into account the number of loops and the number of sausages per loop, the conveyor will advance at a greater or smaller velocity with respect to its normal velocity. This displacement will create a marker through a modified shorter or longer loop. A removed or missed hook will also result in a loop of modified configuration which will serve as a visible marker to the operator. The modified loop will be an immediate visual identifier to the operator that sufficient loops comprising the desired number of sausages have been delivered to the conveyor. The controller can also momentarily stop the meat pump, either by momentarily cutting power to the motor or declutching it, so that there is insufficient meat to completely fill the sausage, which will also act as a visual indicator. Accelerating the pump output will create an overfilled sausage. The operator will then cut the strand in the area of the visual indicator and tie off the ends of the strand on opposite sides of where the cut has taken place. This will allow the person handling the smokestick to know how many loops are to be on the stick without counting or estimating. The spacing of the loops on the stick will be sufficient to avoid the touching phenomenon by the predetermined calculation of the number of loops desired to be on the stick.

The cycle continues and the controller begins to count again the number of linked sausages being produced. If the amount of casing is exhausted before the total count for the second smokestick is reached, the controller will stop the sausage making machine to load a casing, and will resume or restart counting on the next cycle when the next supply of casing material is positioned on the casing machine. The controller will then continue the count until the total amount of linked sausages is reached for the second smokestick, whereupon the controller will create a marker through one of the modes described above and wherein the operator will sever and tie off the strand when the total desired number of linked sausages has been produced. The steps are repeated throughout the run of the particular program designated or until the sausage making machine is powered down.

The apparatus for performing the above method comprises a conventional sausage linking machine with a meat emulsion pump to supply meat emulsion through a stuffing horn into the casing material. A conventional sausage linking apparatus with a plurality of pinching elements causes the filled casing strand of sausage to be linked and to be deposited upon the hooks of a conveyor according to a predetermined program as described heretofore. A controller associated with the machine is programmed to control the meat pump to reduce pumping of meat emulsion if it is desired to use that mode to create a visible marker. Similarly, the controller can control the conveyor to cause the conveyor to advance at a greater or smaller velocity with respect to its normal velocity if that mode of marking is desired.

BRIEF DESCRIPTION OF THE DRAWINGS

FIG. 1 is a forward elevational view of the conveyor hook of this invention;

FIG. 2 is a rearward elevational view thereof;

FIG. 3 is a top plan view thereof;

FIG. 4 is a bottom plan view thereof;

FIG. 5 is an outer side elevational view thereof as viewed from one side of the elongated conveyor chain or the other;

FIG. 6 is an inner side elevational view opposite to that of FIG. 5;

FIG. 10 is a plan view of the conveyor hooks of this invention mounted on an actual conveyor, with one hook missing to create an alternate form of marking;

FIG. 11 is a partial schematic exploded perspective view of a sausage making machine embodying this invention;

FIG. 12 is an enlarged scale plan view taken on line 12—12 of FIG. 11; and

DESCRIPTION OF THE PREFERRED EMBODIMENT

Figure 7:
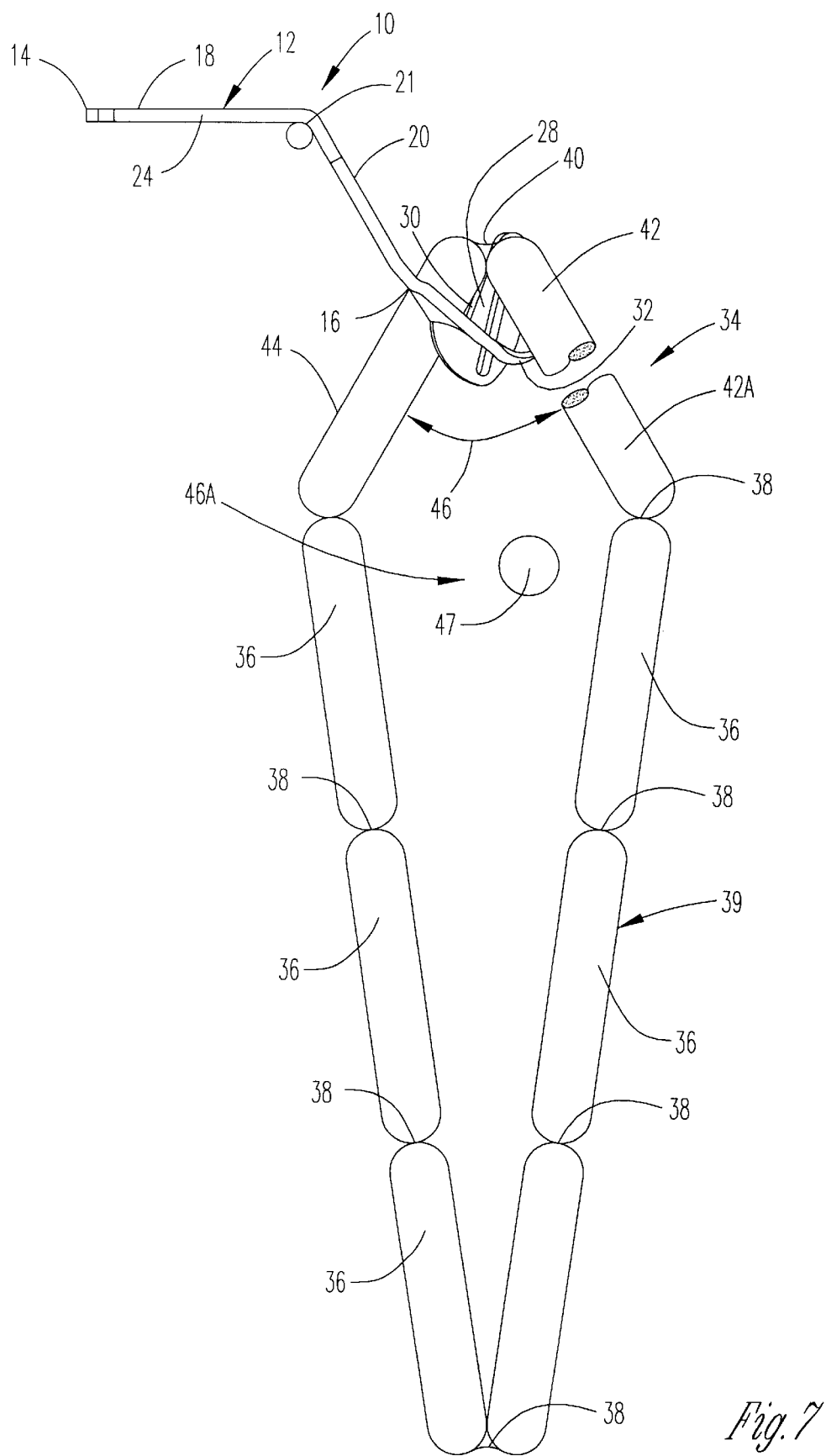
FIG. 7 is an enlarged scale elevational view of a loop of linked sausages supported on a conveyor hook as seen on line 7—7 of FIG. 9.

With reference to FIGS. 1 through 6, the conveyor hook 10 has a support arm 12 which has a first end 14 and a second end 16. The support arm has a first arm portion 18 adjacent end 14 and a second arm portion 20 adjacent second end 16. The support arm is bent at 21 to dispose the first and second arm portions in an angular relation of approximately 45 degrees. As best shown in FIGS. 3 and 4, the support arm 12 has a substantially straight forward edge 22 and a substantially straight rearward edge 24. The support arm is preferably cut from a sheet of metallic material approximately 1/8th of an inch thick and has a flat configuration and is not round in cross section as are most conventional hooks. The second end portion 20 and the second end 16 terminate in a head 26 which has a blade 28 which extends upwardly and forwardly from the lower end 16 and the second arm portion 20. Normally, as will be discussed hereafter, the first arm portion 18 is disposed in a horizontal plane with the second arm portion 20 extending downwardly and outwardly therefrom. The blade 28 has an upper support edge 30 that extends upwardly and forwardly from the lower end of the second arm portion. An arcuate tang element 32 having a link engaging portion 33 extends from the second end 16 of the support arm 12 downwardly, and thence upwardly to be joined to the outer end 28A (FIG. 2) of the blade 28.

With reference to FIG. 7, a linked sausage strand 34 comprised of a plurality of links 36 joined at link points 38 forms a continuous loop 39. Loop 39 is comprised of a pivotal link point 40 at the top with adjacent rearward link 42 and forward adjacent link 44 on opposite sides thereof. The sausage strand 34 is draped over the upper support edge 30, and the adjacent links 42 and 44 extend downwardly from link point 40 and support edge 30 in rearward and forward directions respectively. (The numeral 42A in FIG. 7 is the rearwardly adjacent link of the next succeeding loop 39.) The rearward adjacent link 42 engages the link engaging portion 33 of tang element 32 so that it extends downwardly, outwardly and rearwardly from the supporting edge 30. Similarly, forward adjacent link 44 bends downwardly from its own weight from pivotal link point 40 and extends downwardly, inwardly and forwardly from the support edge 30. The link 44 is held in this position by its engagement with outwardly extending flange 45 (FIG. 3). The bending of flange 45 to its angular position with respect to blade 28 is facilitated by the formation of an elongated slot 45A which is located on the bend line 45B between the blade 28 and the flange 45 (FIG. 1).

It is seen that the conveyor hook of this invention is cut out of a piece of flat plate material and is simultaneously or subsequently bent into the configurations of the various components as described above. The configuration of these components spreads the upper portions of the sausage loops 39 in the manner shown in FIG. 7 to facilitate the entry into the space 46A of the elongated stick 47. In addition, the configuration of the various components on the head 26 of the hook places the loops 39 in an open diagonal position with respect to the direction of travel of the conveyor chain and the hooks to again facilitate the entry of the stick 47 into the loops. As the stick 47 is elevated after being inserted into the loops 39, the pivotal link point 40 slides upwardly over and off of the supporting edge 30 to free the forward adjacent link 44 from the hook, while the passive support supplied by tang element 32 and link engaging portion 33 thereof provides no resistance to the lifting and removal of the loops from the hooks.

Figure 9:
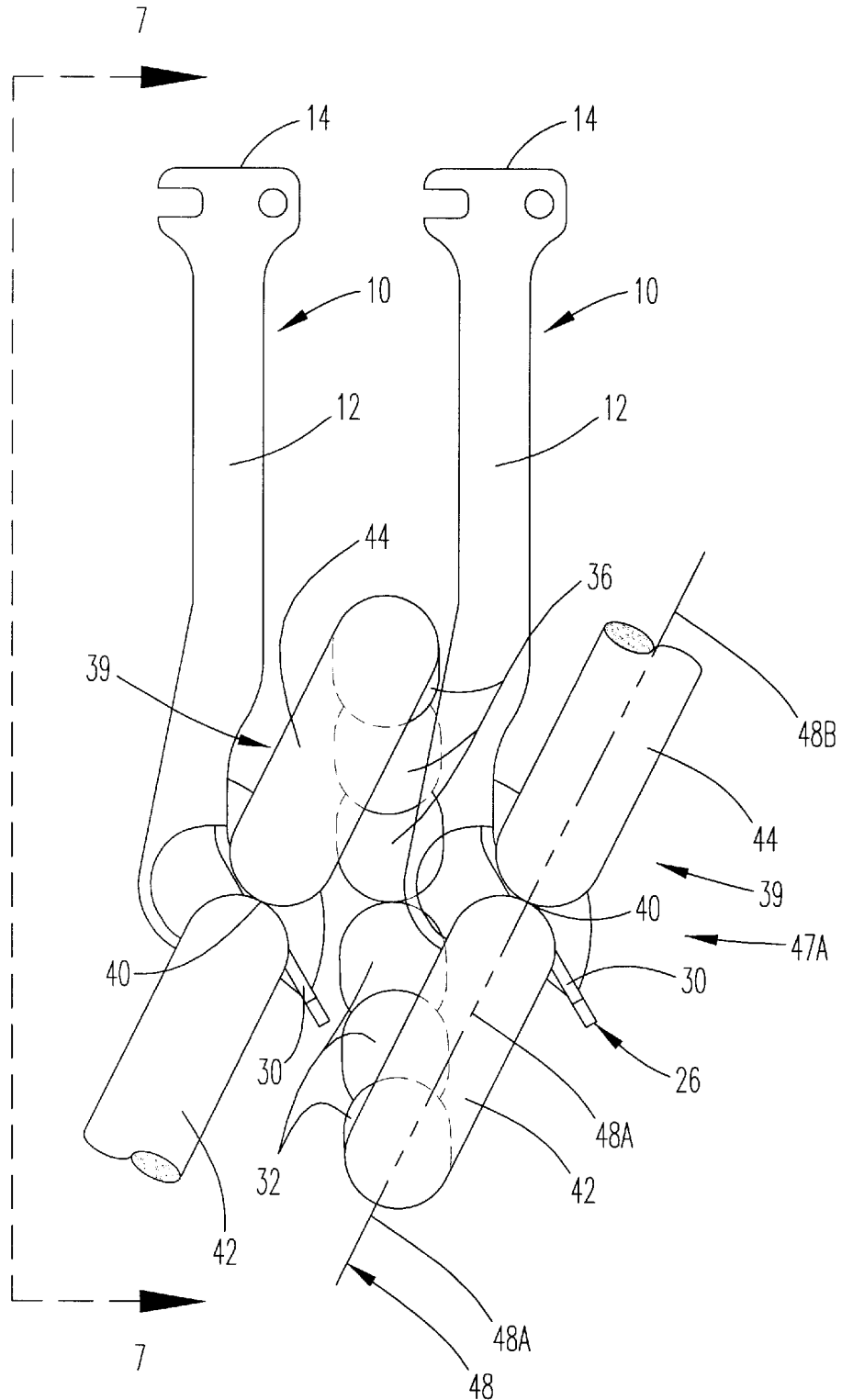
FIG. 9 is a partial plan view of the elements shown in FIG. 8.

The angle 46 between adjacent links 42 and 44 form an angle of approximately 45 degrees which creates the enlarged area of space 46A at the top of loop 39 (FIG. 7). This enlarged space 46A permits the easy insertion of the elongated stick 47 (FIG. 7) into that space. Further, with reference to FIG. 9, it should be noted that the loop 39 basically is contained in diagonal plane 48 which facilitates the insertion of the stick 47 in a longitudinal direction when pointed in a rearward direction along aligned loops 39. (See arrow 47A, FIG. 9.)

The stick 47 can be moved longitudinally in a rearward direction through spaces 46A, or can be held in a stationary longitudinal position whereby a conveyor, as will be described hereafter, while moving the loops 39 in a forwardly direction, can move on to the length of the stick 47.

Again with reference to FIG. 9, adjacent links 42 and 44 dwell in the diagonal plane 48 and therefore are in planar alignment with each other. The rearward adjacent link 42 is in that portion 48A of plane 48 which extends outwardly and rearwardly from upper support edge 30. Similarly, forward adjacent link 44 dwells in that portion 48B of plane 48 which extends inwardly and forwardly from the supporting edge 30. Again, this diagonal disposition of the loops 39 facilitates the entry of the stick 47 into the space 46A of each loop.

It should also be noted that the link engaging portion 33 of tang element 32 presents a passive support for the rearward adjacent link 42 which is easily disengaged from the link 42 as the loops 39 are lifted upwardly and slightly rearwardly from engagement with the support edge 30 for removal from a supporting conveyor.

Each hook 10 has a connector portion 50 at the first end 14 of support arm 12. (FIGS. 3 and 4.) The connector portion 50 has an aperture 52 and a notch 54 to facilitate connection to a conventional conveyor chain 56 (FIG. 10) of conveyor 58. Conveyor chain 56 is mounted on conveyor frame 60 and the chain is operated by any convenient source of power (not shown). The linked sausage strand 34 passes longitudinally through discharge horn 62 and is picked up by the endmost hook 10A as the conveyor chain 56 and the hooks 10 move in a counterclockwise direction (FIG. 10) as indicated by the arrow 64.

With reference to FIG. 11, the numeral 66 designates a sausage making machine having a meat emulsion pump 68, a meat stuffing horn and follower 70, a meat casing twister 72 and a linker assembly 74 downstream from the twister. Linker assembly 74 has rotating members 76 with spaced pinchers 78 thereon. A length of shirred casing 80 (artificial or natural) is slidably mounted on horn 70. All of these components are conventional. The conveyor 58 and discharge horn 62 previously described are located downstream from the discharge end 82 of machine 66.

Figure 13:
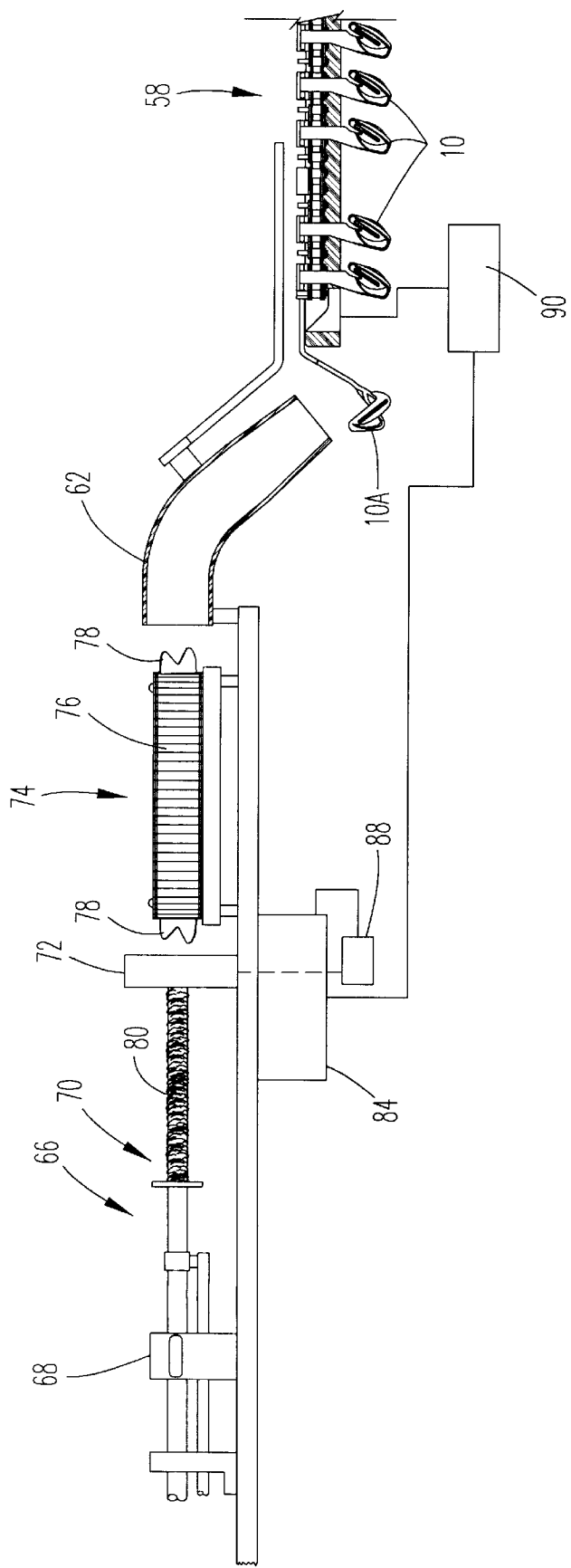
FIG. 13 is a schematic view of the control system for the sausage making machine and the conveyor of this invention.

With reference to FIGS. 12 and 13, a PLC controller 84 is mounted on machine 66 and is operatively connected to motors 88 and 90 which conventionally power the twister 72 and linker assembly 74 (motor 88) and conveyor 58 (motor 90).

Figure 8:
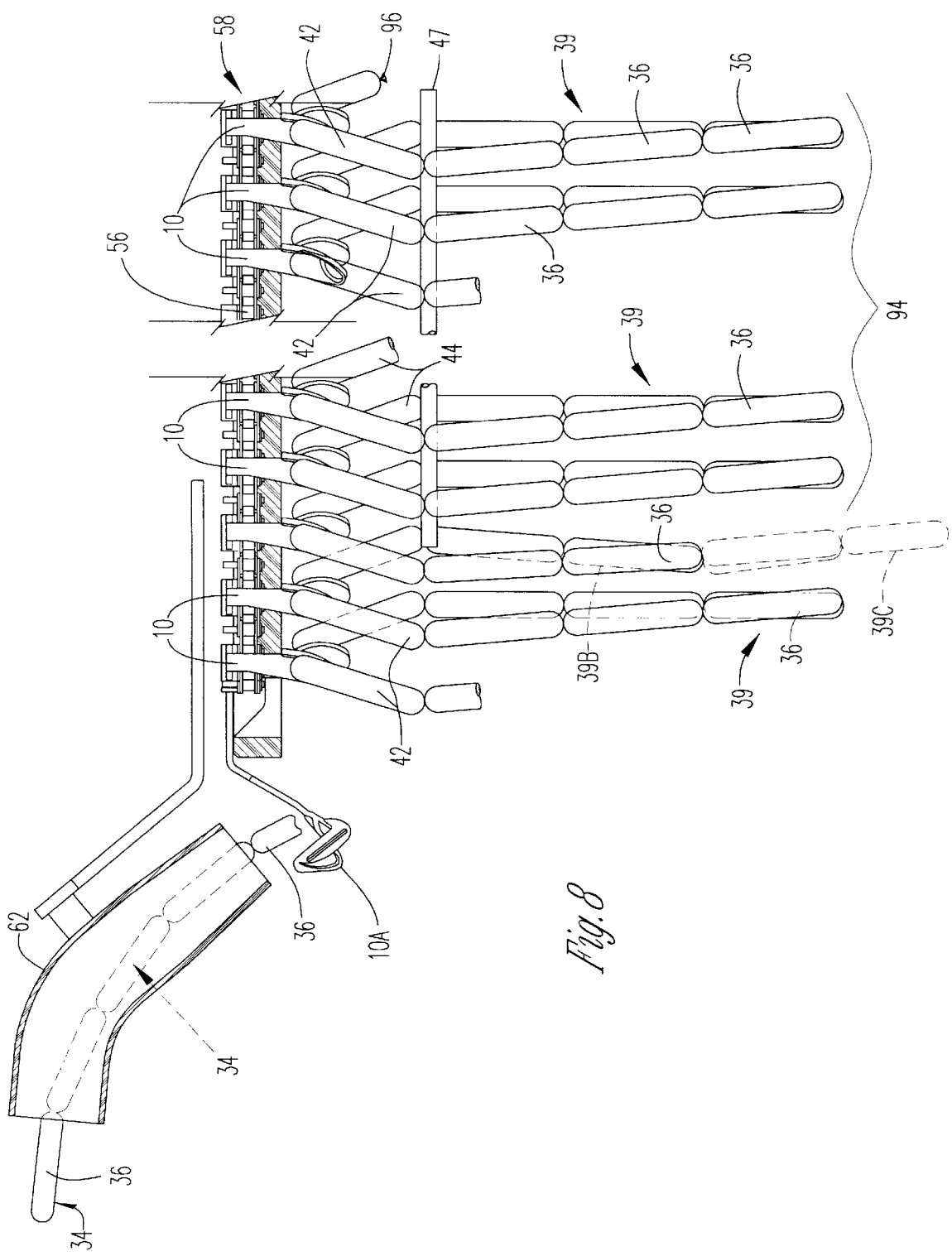
FIGS. 8 and 8A are partial side elevational views of hooks loaded with sausage loops wherein alternate forms of marking are shown.
Figure 8A:
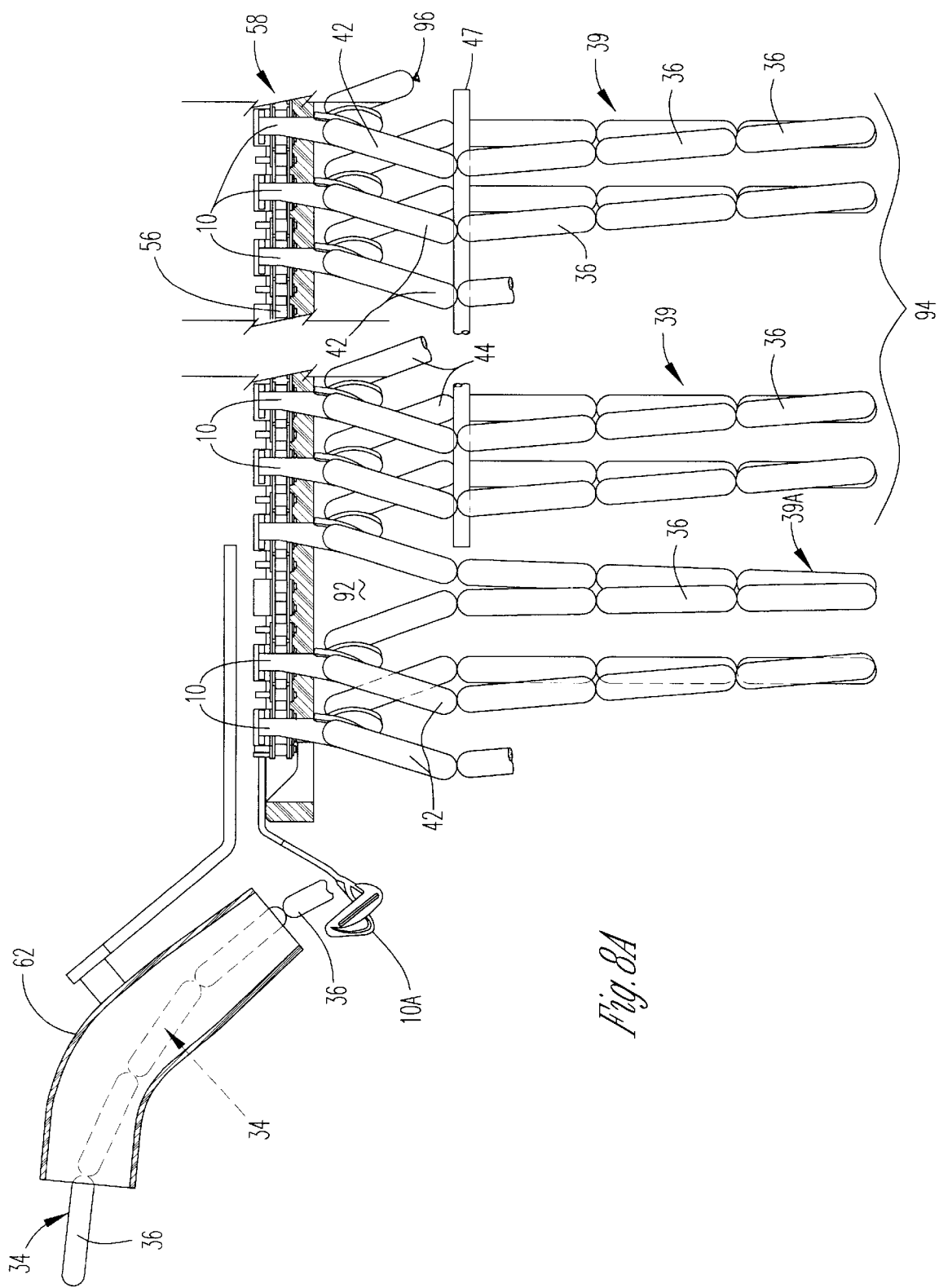

With reference to FIG. 8A, the numeral 92 designates a position where a hook 10 has been removed so that it did not catch the loop which has instead been hung onto the next hook. This results in a loop 39A of different configuration than conventional loops 39 because of the V-shaped configuration thereof at the top of the loop at position 92. This missed hook is one means of providing a visual indicator to advise the machine operator that the predetermined number of linked sausages have been run for the group of sausage loops and sausages designated by the numeral 94. This interruption in the creation of group 94 of loops 39 can also be alternatively accomplished by the controller 84 when the controller 84 advances the conveyor 58 at a greater or smaller velocity after a predetermined number of links 36 have been made to satisfy the required number of loops 39 comprised of the required number of links. Advancing the conveyor at an increased velocity will develop a marker in looper 39B (FIG. 8) of fewer links 36 and of a shorter vertical length. Conversely, advancing the conveyor at a reduced velocity would create a "marker" loop 39C of greater length shown by the dotted lines in FIG. 8.

In operation, the operator starts the machine 66 and commences moving an encased strand of meat emulsion 34 into the twister 72. The strand 34 is then conventionally converted into a series of links 36 by the linker assembly. Specifically, the spaced pinchers 78 on the two rotating members 76 cooperate to create the conventional link points 38. The linked strand then proceeds through discharge horn 62 to be picked up by the endmost hook 10A (FIG. 10) on the conveyor 58.

Prior to the cycling of the machine as described above, the controller 84 is programmed with the specifications for a group 94 of loops 39 consisting of a predetermined number of sausage links 36. The operator then determines the number of loops which should be placed on the smokestick 47 (e.g, 27) with 9 sausages (e.g. per loop). The controller 84 then determines that the group 94 will comprise 243 sausages. When the controller determines that sufficient predetermined links and loops have been produced to permit removal by a smoke stick, one of the four above-described modes of creating a "marker" loop will be invoked. Each of these modes will create a loop of different configurations which will be a quick and easy visual indicator to the operator that the group 94 has been completed. The operator will then cut a link in the marker loop and tie the ends off thereof. See the numeral 96 in FIGS. 8 and 8A. This will allow the person handling the stick 47 to know how many loops are to be on the stick, and the number of links on the stick without counting or estimating.

The computer then begins to count to 243 again as the operation of machine 66 is continued. If the casing 80 is consumed in the middle of the cycle, the controller will end the cycle at that point, memorize the count of linked sausages at that point, and will resume the count when the casing 80 has been replenished on the machine. Then, the second cycle will continue until 243 linked sausages have been counted, whereupon the horizontal link 36A will appear again, and the operator will know that the second cycle is completed. This process is repeated throughout the run of this particular program or until the machine is powered down.

It is apparent that this invention will facilitate the production of the linked sausages to be placed on a conveyor, and then on a smokestick by predetermined specifications. The linking, looping, and deposit of loops on the smokestick will be greatly enhanced and expedited. It is thus seen that this invention will accomplish at least all of its stated objectives.

What is claimed is:

1. A method for determining the number of loops of linked sausages for deposit on a smokestick, comprising,
preparing an elongated strand of stuffed sausages,
dividing the strand of sausages into a plurality of sausage links,
determining the desired number of loops of sausages to be prepared,
depositing the linked sausages into the determined loops and depositing loops of sausages on a plurality of adjacent hooks on a moving conveyor,
intercepting the deposit of linked sausages on adjacent hooks when the predetermined number of linked loops of sausages have been deposited in the predetermined number of loops on the hooks, and then providing a subsequent marker loop of linked sausages on the conveyor having a configuration which has a visible variation with respect to the configuration of the predetermined number of linked loops of sausage,
and repeating the foregoing steps to create another group of sausages similar to the group of sausages created by the foregoing steps.

2. The method of claim 1 wherein the loops deposited on the hooks have an upper portion below the hooks, and spreading a width of the upper portion as the loops are deposited on the hooks to facilitate the longitudinal insertion of an elongated smokestick through the upper portions of the loops to facilitate the lifting of the groups of loops from the hooks.

3. The method of claim 2 wherein the loops are contained in a plane diagonally disposed to the direction of travel of the hooks on the conveyor.

4. The method of claim 1 wherein the marker loop is created by changing the velocity of the conveyor with respect to its normal velocity.

5. The method of claim 4 wherein the velocity of the conveyor is increased with respect to its normal velocity.

6. The method of claim 4 wherein the velocity of the conveyor is decreased with respect to its normal velocity.

7. The method of claim 4 wherein a vertical length of the marker loop is different than the vertical length of the length of the loops of sausages comprising the predetermined number of loops.

8. The method of claim 7 wherein a vertical length of the marker loop is shorter than the vertical length of the length of the loops of sausages comprising the predetermined number of loops.

9. The method of claim 7 wherein a vertical length of the marker loop is longer than the vertical length of the length of the loops of sausages comprising the predetermined number of loops.

10. The method of claim 1 wherein the marker loop has a greater width at an upper end thereof than the width at an upper end of the loops of sausages comprising the predetermined number of loops.

11. The method of claim 10 wherein the greater width at the upper end of the marker loop is created by providing equal spacing between hooks in the conveyor, but eliminating a hook from the conveyor adjacent the hook that supports the last loop of the predetermined number of loops.

12. The method of claim 1 wherein the visible variation in the configuration of linked sausages is accomplished by causing at least one marker link of sausage immediately adjacent the last loop of sausage of the predetermined number of linked loops of sausage to have a volume of sausage material therein which is substantially visually different than the volume of sausage material comprising the sausage links in the predetermined number of sausage loops.

13. The method of claim 12 wherein the strand of stuffed sausages is created by a pump pumping sausage material into an elongated hollow sausage casing, and wherein the volume of sausage material in the marker link is created by momentarily slowing an output of sausage material from the pump so that the marker link will be insufficiently filled by sausage material which is substantially visually less than the volume of sausage material comprising the sausage links in the predetermined number of sausage loops.

14. The method of claim 12 wherein the strand of stuffed sausages is created by a pump pumping sausage material into an elongated hollow sausage casing, and wherein the volume of sausage material in the marker link is created by momentarily increasing an output of sausage material from the pump so that the marker link will be excessively filled by sausage material which is substantially visually greater than the volume of sausage material comprising the sausage links in the predetermined number of sausage loops.

15. An apparatus for determining the number of linked sausages for deposit on a smokestick, comprising,
 a machine for preparing an elongated strand of stuffed sausages, and having a discharge end,
 a sausage linker apparatus on the machine for receiving a sausage strand for dividing a strand of sausages into a plurality of sausage links,
 a movable conveyor located adjacent the discharge end of the machine, with spaced hook elements thereon for receiving from the machine loops of linked sausages from the machine while the conveyor is moving,
 a controller associated with the machine having a memory of a predetermined number of loops of sausages to be included in a group of a predetermined number of loops of sausages,
 the memory of the controller also having the number of linked sausages that will be included in the loops of sausages to be prepared,
 the controller being operative to control a power unit operatively connected to the conveyor so as to control the movement of hooks on the conveyor, and
 the controller being operative when a predetermined number of loops of sausages have been deposited on the conveyor to provide a marker loop of linked sausages having a configuration which has a visible variation with respect to the configuration of the predetermined number of loops of sausage.

16. The apparatus of claim 15 wherein the controller is operative to change the speed of operation of the conveyor to change the configuration of the marker loop.

17. The apparatus of claim 16 wherein the controller varies the configuration of the marker loop by changing the velocity of movement of the conveyor while the marker loop is being formed.

18. The apparatus of claim 17 wherein the controller slows the velocity of the conveyor while the marker loop is being formed.

19. The apparatus of claim 18 wherein the controller increases the velocity of the conveyor while the marker loop is being formed.

20. The apparatus of claim 15 wherein the controller is operative to change the vertical length of the marker loop with respect to the vertical length of the predetermined number of loops.

21. The apparatus of claim 20 wherein the controller is operative to decrease the vertical length of the marker loop with respect to the vertical length of the predetermined number of loops.

22. The apparatus of claim 21 wherein the controller is operative to increase the vertical length of the marker loop with respect to the vertical length of the predetermined number of loops.

23. The apparatus of claim 15 wherein the hooks on the conveyor are spaced equally except no hook is sequentially located on the conveyor adjacent the hook that supports the last loop of the predetermined number of loops, whereupon the last loop is supported by adjacent hooks on opposite sides of a space on the conveyor where a hook has been omitted.

24. The apparatus of claim 15 wherein a sausage material pump is on the machine to pump sausage material into a hollow elongated casing to create the sausage strand, and wherein the controller is operatively associated with the pump to vary the amount of sausage material delivered to at least one link of the marker loop which is substantially visually different than the volume of sausage material comprising the sausage links in the predetermined member of sausage loops.

25. The apparatus of claim 24 wherein a sausage material pump is on the machine to pump sausage material into a hollow elongated casing to create the sausage strand, and wherein the controller is operatively associated with the pump to vary the amount of sausage material delivered to at least a first link of the marker loop which is substantially visually less than the volume of sausage material comprising the sausage links in the predetermined member of sausage loops.

26. The apparatus of claim 25 wherein a sausage material pump is on the machine to pump sausage material into a hollow elongated casing to create the sausage strand, and wherein the controller is operatively associated with the pump to vary the amount of sausage material delivered to at least a first link of the marker loop which is substantially visually greater than the volume of sausage material comprising the sausage links in the predetermined member of sausage loops.

* * * * *